United States Patent [19]

Alcaraz et al.

[11] 4,239,823

[45] Dec. 16, 1980

[54] AUTOMOBILE SOUND INSULATING PANEL AND METHOD OF MAKING SAME

[75] Inventors: Anthony J. Alcaraz, Petersburg; Christopher W. Chandler, Sandston; Thomas G. Edmundson, Midlothian, all of Va.; James P. Nolan, deceased, late of Chester, Va., by Evelyn L. Nolan, executrix

[73] Assignee: Dayco Corporation, Dayton, Ohio

[21] Appl. No.: 13,651

[22] Filed: Feb. 21, 1979

[51] Int. Cl.³ ............................................. B05D 1/30
[52] U.S. Cl. .................. 427/420; 264/45.3; 264/45.8; 264/50; 264/DIG. 60; 427/373; 428/310; 118/705
[58] Field of Search ................ 428/310, 159; 427/373, 427/420; 264/45.3, 46.4, 50, 45.8, DIG. 60

[56] References Cited

U.S. PATENT DOCUMENTS

| 3,429,728 | 2/1969 | Goldstone et al. ................... 427/420 |
| 3,980,511 | 9/1976 | Proucelle ..................... 264/DIG. 60 |
| 4,035,215 | 9/1977 | Goldstone ........................... 427/195 |

FOREIGN PATENT DOCUMENTS

| 2544033 | 4/1977 | Fed. Rep. of Germany ........... 428/310 |
| 1273468 | 5/1972 | United Kingdom ..................... 428/310 |
| 1317891 | 5/1973 | United Kingdom ..................... 428/310 |

*Primary Examiner*—George F. Lesmes
*Assistant Examiner*—E. Rollins Buffalow
*Attorney, Agent, or Firm*—Charles E. Bricker; Reuben Wolk

[57] ABSTRACT

An automobile sound insulating panel and apparatus for and method of making same are provided wherein such panel comprises a contoured fibrous pad and a plastisol layer bonded against the pad with the plastisol layer comprising a foamed plastisol layer having randomly disposed air pockets therethrough which provide a minimum weight for the panel while improving the acoustical properties thereof.

8 Claims, 11 Drawing Figures

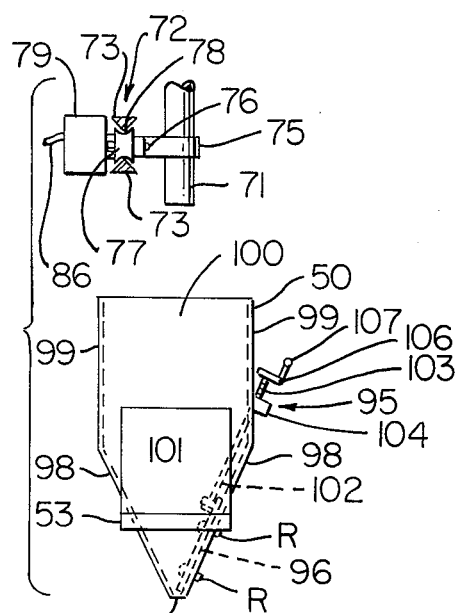
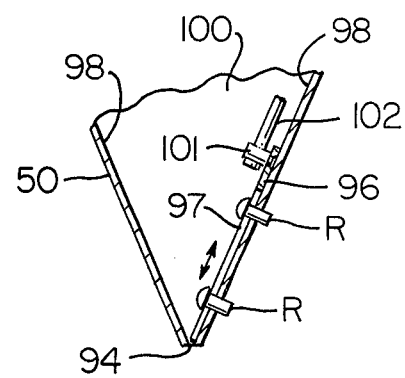
FIG.3　　FIG.4
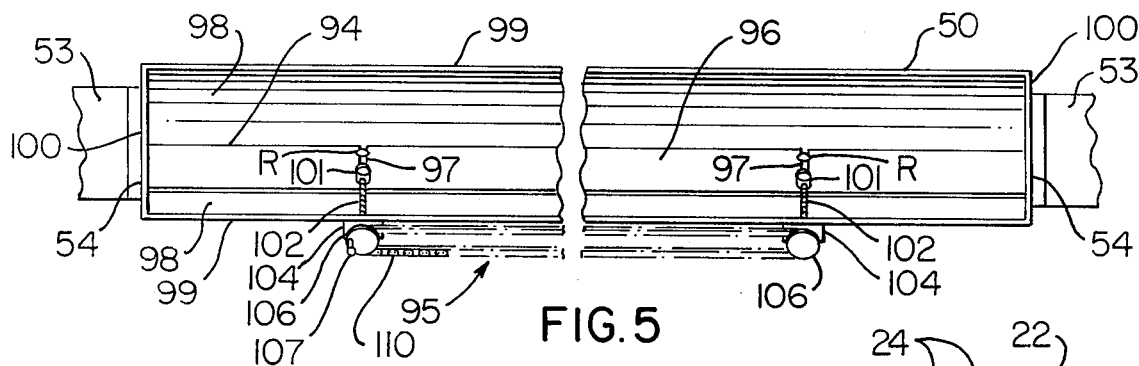
FIG.5
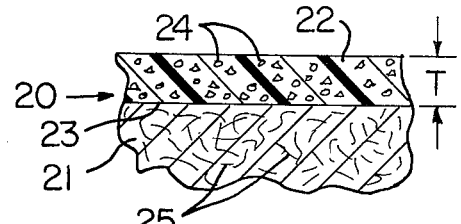
FIG.7
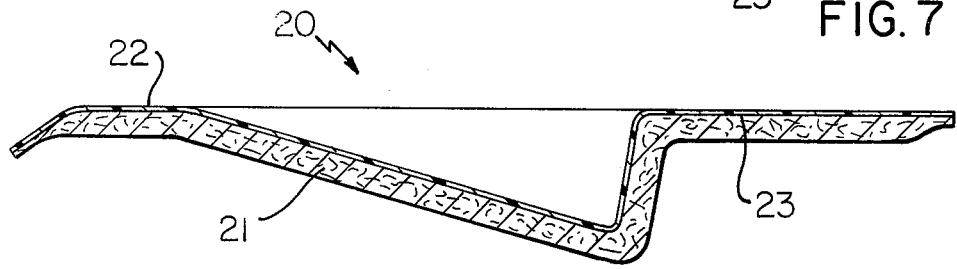
FIG.6

AUTOMOBILE SOUND INSULATING PANEL AND METHOD OF MAKING SAME

BACKGROUND OF THE INVENTION

1. Field of the Invention

This invention relates to a sound insulating panel for disposal adjacent a structural panel of an automobile and to an apparatus for and method of making same.

2. Prior Art Statement

It is known in the art to provide a sound insulating panel of the type which is disposed adjacent a structural panel of an automobile and wherein such panel is comprised of a fibrous pad which is coated with a dense liquid vinyl plastisol coating and thereafter the resulting construction is contoured employing an associated mold device and further processed to set the contour, and such a panel is disclosed in U.S. Pat. No. 4,035,215. It is also disclosed in this patent to provide such a sound insulating panel which has a preliminary contour imparted thereto whereupon a coating of a dense liquid vinyl plastisol is applied thereagainst and then a final contour is provided in a mold device and the construction further processed as before.

It is also known in the art to provide an automobile sound insulating panel comprised of a contoured fibrous pad which has a dense liquid vinyl plastisol layer bonded thereagainst.

However, each of the panels mentioned above is of maximum weight due to the utilization of a dense vinyl plastisol i.e., plastisol which is free of substantial air pockets or voids. Accordingly, with the increasing scarcity and cost of automobile fuels it is exceedingly important to reduce automobile weight as much as possible without sacrificing automobile safety and comfort. It has also been found that the sound insulating properties of such a panel are not aided by using dense vinyl plastisol as a coating or layer on a fibrous pad.

SUMMARY

It is a feature of this invention to provide a sound insulating panel for an automobile comprised of a fibrous pad and a foamed plastisol layer bonded against such pad.

Another feature of this invention is to provide a panel of the character mentioned in which the foamed plastisol layer has randomly disposed air pockets or voids therethrough which help provide a minimum weight for the panel as well as improve the acoustical properties of such panel.

Another feature of this invention is to provide a panel of the character mentioned comprised of a preformed contoured fibrous pad made of resinated fibers which may consist of all natural fibers, all synthetic fibers, or a mixture of natural and synthetic fibers.

Another feature of this invention is to provide a panel of the character mentioned wherein the fibrous pad is comprised of a plurality of layers or thickness of garnetted stock formed together as a single-thickness pad.

Another feature of this invention is to provide a panel of the character mentioned in which the foamed plastisol layer is comprised of a vinyl resin.

Another feature of this invention is to provide a panel of the character mentioned comprised of a polyvinyl chloride resin, a plasticizer, a filler, a solvent, and a foaming aid.

Another feature of this invention is to provide an improved apparatus for making a panel of the character mentioned.

Another feature of this invention is to provide an improved method of making a panel of the character mentioned.

Therefore, it is an object of this invention to provide an improved automobile sound insulating panel and an apparatus for and method of making such panel having one or more of the novel features set forth above or hereinafter shown or described.

Other details, uses, features, objects, and advantages of this invention will become apparent from the embodiments thereof presented in the following specification, claims and drawings.

BRIEF DESCRIPTION OF THE DRAWINGS

The accompanying drawings show present preferred embodiments of this invention, in which

FIG. 3 is a view with parts broken away taken essentially on the line 3—3 of FIG. 2;

FIG. 4 is a fragmentary cross-sectional view taken essentially on the line 4—4 of FIG. 2;

FIG. 5 is a view with parts broken away looking substantially vertically downwardly into the open top of the trough of FIG. 1;

FIG. 6 is a cross-sectional view of an exemplary automobile sound insulating panel after processing thereof employing the apparatus and method of this invention and showing the preformed or contoured fibrous pad which has a foamed plastisol layer bonded thereagainst;

FIG. 7 is an enlarged fragmentary cross-sectional view particularly highlighting that the plastisol layer is a foamed plastisol layer having air spaces randomly disposed therethrough;

DETAILED DESCRIPTION

Figure 1:
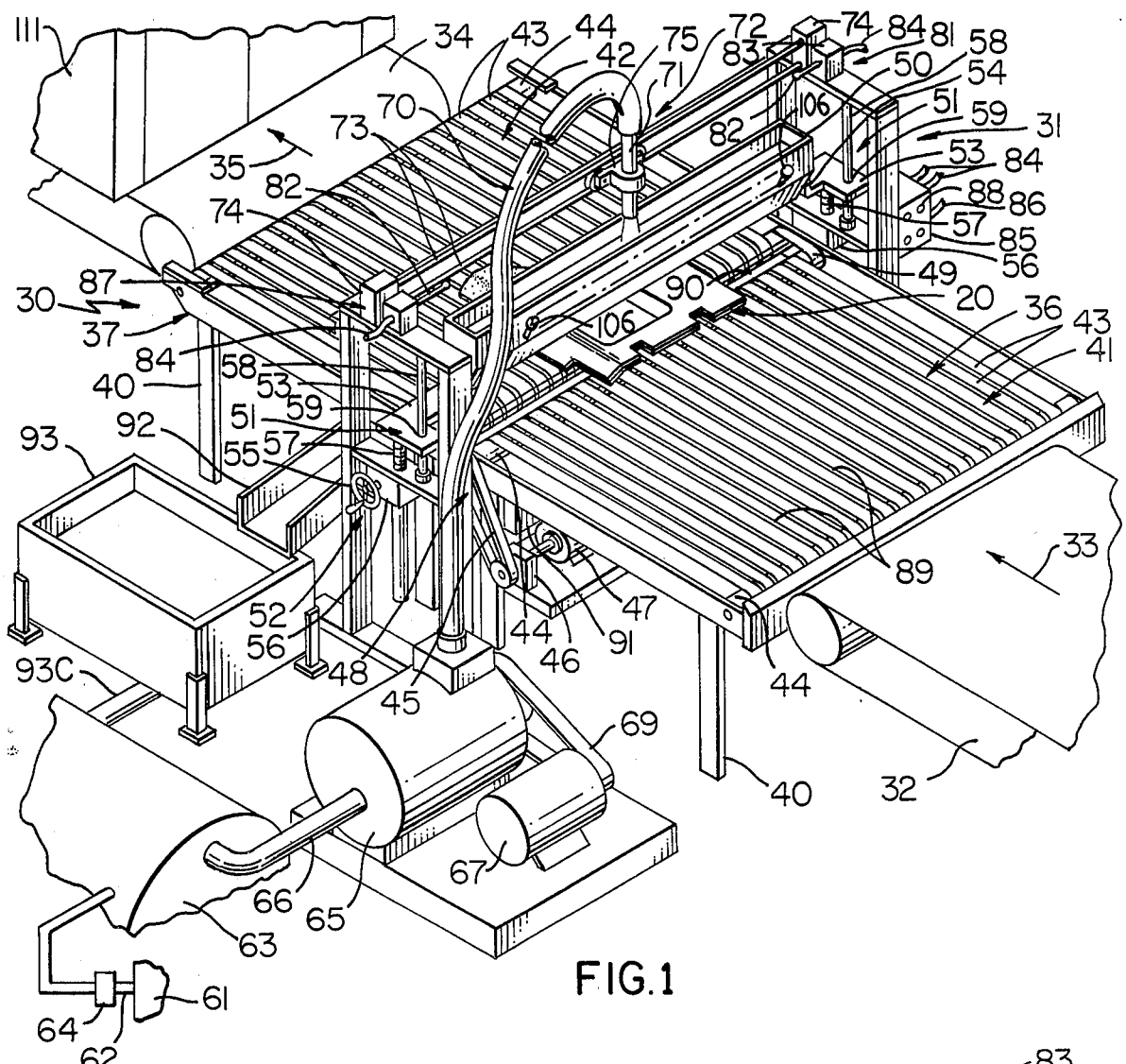
FIG. 1 is a perspective view with parts broken away illustrating an exemplary automobile sound insulating panel of this invention being processed employing one exemplary embodiment of the apparatus and method of this invention.

Reference is now made to FIGS. 1, 6, and 7 of the drawings which illustrate one exemplary embodiment of a sound insulating panel of this invention which is particularly adapted for disposal adjacent a structural panel of an automobile and such panel is designated generally by the reference numeral 20 in each of such FIGS. The panel 20 comprises a contoured or preformed fibrous pad 21 (FIGS. 6 and 7) and a foamed plastisol layer 22 bonded against the pad 21 and details of the pad 21, layer 22, and apparatus and method for making same will be presented subsequently.

The foamed plastisol layer 22 of the exemplary panel 20 has a finalized or formed surface 23 and the layer 22 is bonded against surface 23 and has a substantially uniform thickness "T" throughout. The layer 22 has randomly disposed air pockets 24 throughout and a representative few of such pockets 24 have been designated by the reference numeral 24. The air pockets 24 provide a minimum weight for the panel 20 and such air pockets also serve to improve the acoustical properties of the layer 22 and the overall panel 20.

The fibrous pad 21 is comprised of resinated fibers randomly disposed therethrough and a representative few of such fibers are designated by the same reference numeral 25. The fibers 25 are referred to as resinated fibers in that they are bonded together in a single thickness layer by a suitable resin of any type known in the art which is compatible with fibers 25 and the processing temperatures for such fibers, the normal expected ambient temperature environment in which the panel 20 is to be used, and the employed resin serves to bond the fibers 25 at their fiber junction as a unitary mass.

The fibers 25 may comprise natural fibers, snythetic fibers and a specific example of the fibers employed in a typical pad 21 will be presented in detail subsequently. Further, the weight of fibers 25, amount of such fibers, and amount and type of resin employed may be as known in the art and hence will not be described herein in detail. In addition, the voids in the contoured fibrous pad and the techniques employed to define such pad to assure provision of the desired thickness thereof and desired acoustical properties of such pad are well known in the art and will not be described herein.

The thrust of this invention is to provide a foamed plastisol layer 22 which has air pockets 24 dispersed therethrough yet such foamed layer improves the structural integrity of the overall panel 20. In operation the randomly disposed air pockets 24 serve as miniature chambers which tend to break up the transmission of sound waves through the layer 22 and the air pockets 24 cooperate with the vinyl plastisol layer 22 in which they are formed and the voids between fibers 25 to provide the overall panel 20 with optimum sound insulating properties and substantially better than automobile sound insulating panels proposed heretofore. A detailed relationship of the volume of air pockets 24 to the overall volume of the layer 22 will be presented subsequently.

Having described panel 20 reference is now made to FIG. 1 of the drawings for a detailed presentation of an apparatus and method for making the automobile sound insulating panel 20 and such apparatus and method is designated generally by reference numeral 30. The apparatus 30 comprises a pad coating device designated generally by the reference numeral 31 and means for moving a preformed contoured fibrous pad 21 through the apparatus 30. The moving means comprises a belt conveyor system 32 upstream of the device 31 and the belt conveyor system 32 moves the preformed or contoured fibrous pad 21 to the device 31 as indicated by the arrow 33. The moving means for moving the apparatus 30 also include conveyor system 34 which moves the coated panels 20 out of the coating device 31 and as indicated by the arrow 35 in FIG. 1.

The device 31 comprises what amounts to a porous movable support bed 36 which is defined by a supporting frame structure 37 which is carried by a plurality of legs 40 above a supporting floor. The support bed 36 is comprised of two conveyor portions defined by an upstream portion 41 and a downstream portion 42; and, each portion 41 and 42 of this example is comprised of a plurality of substantially identical spaced endless belts 43. The belts 43 of each portion 41–42 are suitably supported on and rotate with associated cylinders 44 at opposite ends thereof. The cylinders 44 are fully rotatable and at least one cylinder 44 of portion 41 is suitably rotated in a synchronized manner with a cylinder 44 of portion 42 to thereby rotate its associated belts 43 and provide the porous movable support bed 36. In this example of the invention the upstream portion 41 is rotated by rotating the downstream cylinder 44 thereof as shown at 48 by an endless power transmission belt 45 operatively engaged about such cylinder 44. The belt 45 is driven through a gear box 46 by a motor 47 to thereby provide a movable upstream support bed 41. A suitable driving interconnection in the form of another endless drive belt or endless chain drive 49 is suitably interconnected between the downstream cylinder 44 of the upstream support bed 41 and the upstream cylinder 44 of the downstream support bed 42 so that upon driving belt 45 with motor 47 the entire support bed 36, including upstream portion 41 and downstream portion 42, moves as a movable porous support for a workpiece such as a fibrous pad 21 which is to be coated with liquid foamed plastisol.

The coating device 31 also comprises an elongate open top trough 50 which extends substantially across its full width and across the full width of the porous support bed 36. The trough 50 is disposed above the support bed 36 and is supported at its opposite ends by a pair of structural assemblies each designated generally by the reference numeral 51.

Each structural assembly or vertical support 51 has an adjustment mechanism which is designated generally by the reference numeral 52 which is used to adjust or position its end of the trough 50 above the support bed 36. Each mechanism 52 includes a support plate 53 which is suitably detachably fixed to an associated end of the trough 50 as shown at 54 and each adjustment mechanism 52 includes a handwheel 55, gear box assembly 56 and a threaded screw 57. Each threaded screw 57 is suitably operatively connected at its lower end to the gear box assembly 56 and its upper end to the plate 53. With these cooperating components it is a simple matter to rotate the handwheel 55 in one direction to raise the associated end of the trough 50 and rotate the handwheel 55 in an opposite direction to lower the associated end of trough 50. The handwheels 55 of mechanisms 52 at opposite sides of device 31 are rotated or operated in a corresponding manner to assure that the trough 50 is positioned horizontally over the movable bed 36 which is also maintained to provide support of workpiece or panels 20 in a horizontal plane. To assure smooth vertical movements both upwardly and downwardly each mechanism 52 also has a guide rod 58 operatively associated therewith. Each guide rod 58 is supported by an associated support structure 51 and extends through an opening 59 in its associated trough support plate 53 so that as the associated plate and trough end are adjusted vertically the movement is a precise vertical movement.

The open top trough 50 is provided with a foamed plastisol and the foamed plastisol is introduced into the trough 50 in such a manner as to maintain a predetermined level thereof across the entire length of the trough and thereby assure provision of a uniform static pressure head thereacross. The uniform level and uniform static pressure head assures provision of a controlled curtain of liquid foamed plastisol which flows over the fibrous mat 21 being coated with optimum uniformity. The manner in which the level of liquid foam plastisol is maintained throughout the entire length of the trough will be described in detail subsequently.

The basic constituents of the composition used to define the plastisol layer 22 are suitably provided and mixed in a mixer of the type known in the art, such as a vertical paddle mixer 61, a fragmentary portion of which is shown in FIG. 1. The mixed material exits the mixer 61 through a conduit 62 and flows into an intermediate storage tank 63; and, the conduit 62 has a suitable filter 64 provided therein. The composition in the tank 63 is introduced into a foaming apparatus or so-called foamer 65 of known commercial construction through a conduit 66 which is in fluid flow communication with the bottom portion of the tank 63. The foamer 65 is driven by a suitable motor 67 which has an endless power transmission belt 69 operatively connected between the motor 67 and the foamer 65.

The foamer 65 operates in a manner known in the art to introduce air in the desired ratio into the plastisol composition and the foamed plastisol exits the foamer 65 through a flexible conduit 70 which terminates in a nozzle 71, and the nozzle 71 introduces the liquid foamed plastisol by gravity feed into the open top of the trough 50. As previously mentioned the level of the liquid foamed plastisol in the open trough 50 is provided and maintained in a precise manner so that the flow of liquid foamed plastisol from the tank 50 is in a precisely controlled curtain.

Figure 2:
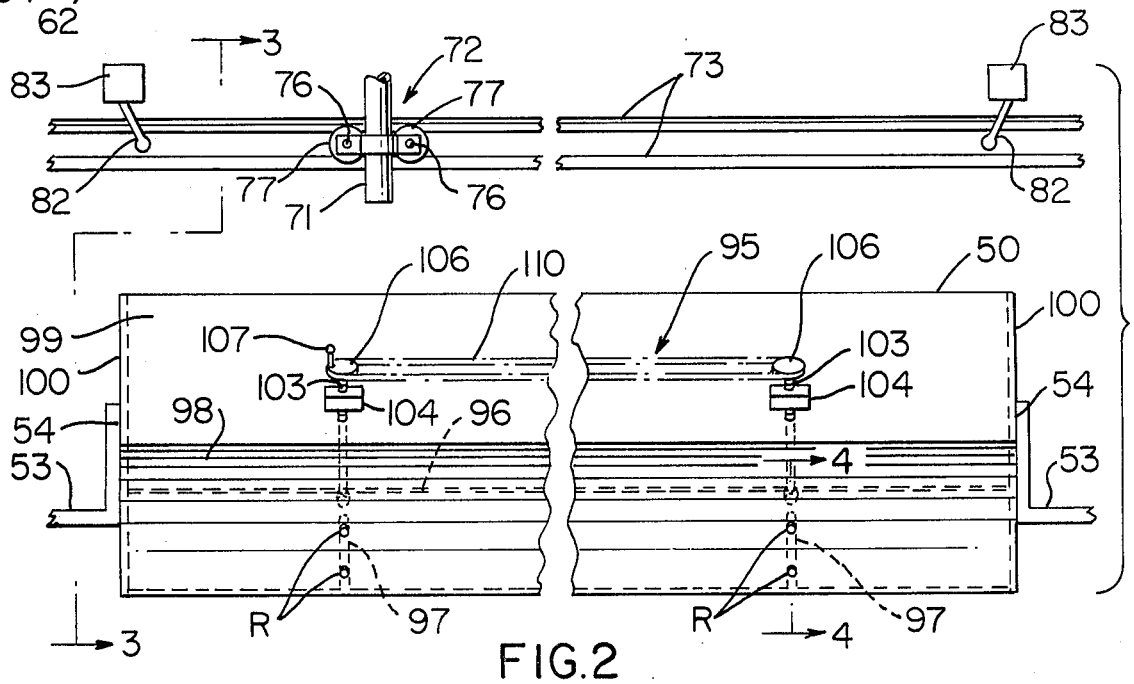
FIG. 2 is a view with parts in elevation and parts broken away particularly illustrating an open top elongate trough used in the apparatus and method of FIG. 1 together with certain associated components used to provide and maintain liquid foamed plastisol at a predetermined level in such trough.

To provide and maintain such level of foamed liquid with precision across the entire length of trough 50 suitable nozzle support and moving means 72 is provided and means 72 includes components which reciprocate the nozzle 71 back and forth across the open top trough. The nozzle moving and support means 72 consists of a plurality of bars or rods each designated by the same reference numeral 73 and the rods 73 have their opposite ends suitably supported by support blocks 74 fixed to the support structures 51, FIG. 1. The nozzle 71 is detachably fixed on a carriage 75 and such carriage rotatably carries a pair of spaced shafts 76 (FIG. 2) which have a pair of grooved wheels 77 keyed thereto. As seen in FIG. 3, the rods 73 are disposed within grooves 78 of the wheels 77 at diametrical locations so that such rods support the carriage 75 and nozzle 71 for movement back and forth thereacross and hence across the full width of the movable support bed 36.

If desired, the carriage 75 and nozzle 71 may be reciprocated across the support rods manually to discharge liquid foamed plastisol into the open top trough 50 to maintain a predetermined precise level therein. However, in this example the reciprocation of the carriage 75 and nozzle 71 is achieved automatically by an electric motor 79 (FIG. 3) which has its output shaft suitably keyed or otherwise fixed to an associated shaft 76. Rotation of the motor 79 in one direction of rotation causes corresponding rotation of its associated shaft 76 and wheel 77 to thereby move the carriage 75 and nozzle 71 in a corresponding direction across the length of the open top trough 50. Rotation of the motor 79 is continued in the above-mentioned one direction until the carriage 75 moves adjacent one terminal end of rods 73 carried by one support structure 51 as shown at 81 and engages an actuating arm 82 of a limit switch 83 fixed to the support structure 51 at such one terminal end.

It will be appreciated that a limit switch 83 with an arm 82 is provided on each support structure 51 and each limit switch 83 has an electrical cable 84 connecting same to a power supply and control system 85. The motor 79 has a flexible cable 86 connecting same to the system 85 for supplying power thereto as well as controlling its direction of rotation and the system 85 is supplied with power from any suitable source.

Once the carriage 75 engages arm 82 to actuate the limit switch 83 at 81, the control system 85 automatically operates to provide reversal of the direction of rotation of the motor 79 thereby reversing the direction of rotation of the wheel 77 coupled thereto whereby movement of the nozzle 71 is provided in an opposite direction across the rods 73 and this movement is continued until carriage 75 engages the actuating arm 82 of the limit switch 83 on the opposite support structure 51 shown at 87 whereby an electrical signal is provided through its electrical cable 84 to the control system 85 which again causes reversal of rotation of the motor 79 causing movement of the carriage 75 in an opposite direction back toward the rod end shown at 81. The control system 85 provides continuing reciprocating movement of the carriage 75 and nozzle 71 across the full length of the open top trough 50 until manually overridden by actuating a suitable switch 88 in the system 85, whereby the level of liquid foamed plastisol in the trough is maintained at the desired predetermined level.

The flow from the trough 50 is entirely by gravity and as a curtain of liquid foamed plastisol as will be explained subsequently. The amount of such plastisol which flows as a curtain is such that it defines layer 22 of the desired thickness. Because of the way in which the coating device 31 is constructed and each pad 21 is moved under trough 50, plastisol which is not applied against a fibrous pad 21 flows through openings 89 between the belts 43 as well as through a comparatively large rectangular space 90 between the upstream portion 41 and downstream portion 42 of the movable support bed 36 into a pan 91 which extends the full width of the coating device 31 under the trough 50. Liquid foamed plastisol flows by gravity from the pan 91 into a pan discharge chute 92 to a collection tank 93. The liquid foamed plastisol in the tank 93 flows by gravity into the intermediate storage tank 63 by means of a conduit 93C.

With this system, the excess liquid foamed plastisol is reintroduced into the foamer 65 and the controls in the foamer 65 are such that the amount of air in the foamed liquid is controlled in a manner which is known in the art taking into account not only the liquid introduced into the tank 63 through conduit 62 from mixer 61 but also the liquid foamed plastisol introduced through conduit 93C.

The open top trough 50 has an elongate discharge slot 94 at the bottom thereof for discharging the liquid foamed plastisol and defining a curtain thereof. The coating device 31 also has an apparatus for controlling the area of the slot 94 and such apparatus is designated generally by the reference numeral 95 in FIGS. 3 and 5.

The apparatus 95 consists of a control plate 96 which extends across the full length of the trough 50 and is disposed above the slot 94.

The control plate is held in position by a pair of rivets R at each end. The control plate 96 has a pair of spaced elongated openings 97 therein adjacent its opposite ends and a pair of rivets R extend through an opening 97 which allows the plate 96 to be moved substantially vertically upwardly and downwardly as indicated by the double arrow in FIG. 4 even though held in position by rivets R against an associated inclined wall 98 defining the lower portion of the trough. The wall 98 is substantially identical to an opposite wall 98 of the trough 50 and the inclined walls 98 are adjoined by a pair of vertical walls 99. The end walls of the trough 50 are substantially identical and each designated by the same reference numeral 100. Each end wall 100 is comprised of a rectangular top portion and a roughly triangular bottom portion. Movement of the control plate 96 is achieved to change the effective area of the slot 94 and as will now be described.

The control device 95 also comprises a pair of brackets 101 at its opposite ends and a pair of rods 102 are attached to the brackets 101 in such a manner that the ends of the rods 102 are freely rotatable relative to such brackets 101. The upper portion of each rod 102 has external threads 103 which are threadedly received in an associated internally threaded member 104 fixed to a wall 99 of the trough 50. Thus, upon rotating each rod 102 in one direction the effect is to thread same through threaded member 104 and provide a corresponding movement of the plate 96; and rotating each rod 102 in an opposite direction provides an opposite movement of the plate.

To provide rotation of the threaded rods 102, toothed wheels 106 are fixed to the upper ends of the rods and one of the toothed wheels has a handle 107 to facilitate rotation thereof. A sprocket chain 110 is provided and chain 110 engages the teeth of the toothed wheels 106 so that upon rotating the handle 107 and its associated toothed sprocket in one direction both rods 102 are simultaneously rotated in the corresponding direction to thereby move the plate 96 in the corresponding direction. The reverse rotation of the handle 107 produces the reverse movement of the plate 96. In this manner, it will be seen that the area of the slot 94 is precisely controlled and correlated with the amount of liquid foamed plastisol provided through the nozzle 71 to assure provision of the desired level in the trough 50 so that with substantially constant delivery from the foamer 65 the curtain of liquid foamed plastisol is, in essence, defined by the static pressure head of the foamed liquid in the trough 50.

After coating of the fibrous pad 21 with layer 22 of liquid foamed plastisol the coated pad is moved by the belt conveyor 34 as indicated by the arrow 35 in FIG. 1 to a curing apparatus which may be in the form of an oven or heat tunnel 111 whereupon such layer 22 is cured. In this example, foamed plastisol is defined of a polyvinyl chloride resin and has a formulation to be subsequently described whereby the oven temperature is generally of the order of 450° to 500° F. During the curing step there is a simultaneous bonding of the foamed plastisol layer 22 to the fibrous pad 21.

Each completed panel 20 after exiting the curing apparatus 11 is suitably cooled employing any technique known in the art. For example, panel 20 may be cooled employing ambient air which may include a forced flow of such ambient air. In addition, the cooling may be achieved utilizing a cooling liquid such as a mist of water sprayed directly against the plastisol layer. Similarly, a combination of air and liquid cooling may be employed. Once cooled, the panel 20 has the foamed plastisol layer 22 bonded against the fibrous pad 21 thereof with the layer 22 having randomly disposed air pockets 24 throughout which serve to reduce the overall weight of the panel while improving the acoustical properties of such panel as previously described.

Figure 8:
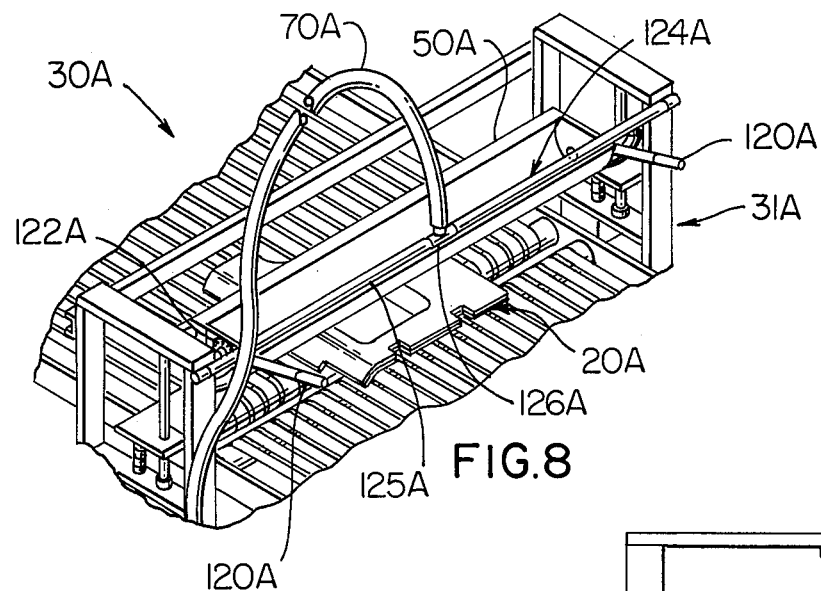
FIG. 8 is a fragmentary perspective view illustrating another exemplary embodiment of the apparatus and method of this invention which may be employed in coating an automobile sound insulating panel and consisting of another embodiment of an open top trough.
Figure 9:
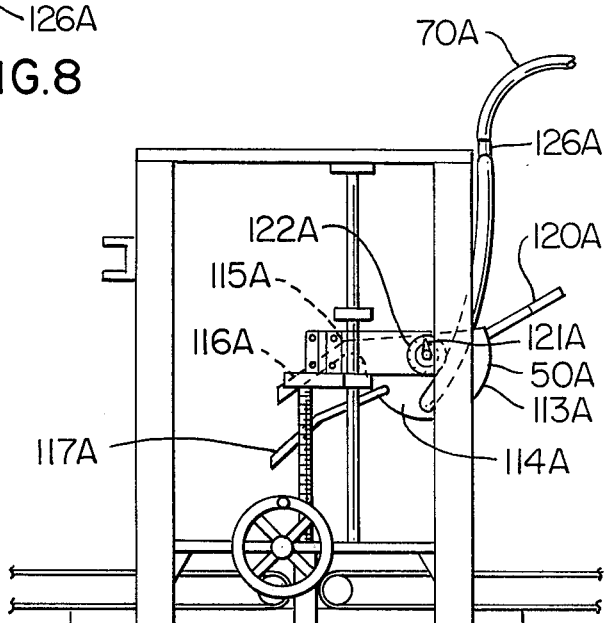
FIG. 9 is a fragmentary view particularly illustrating a side elevation of the open top trough of FIG. 8 and structure associated therewith.
Figure 10:
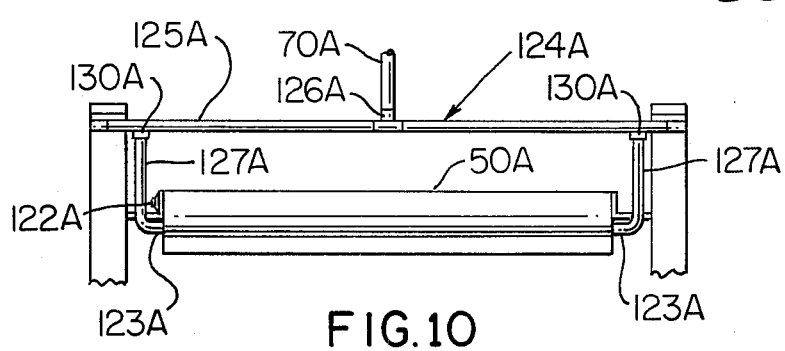
FIG. 10 is a view particularly illustrating one embodiment of a filler apparatus for providing and maintaining liquid foamed plastisol at a predetermined level in the trough of FIG. 8.

Another exemplary embodiment of the apparatus and method of this invention which may be used in defining the panel 20 is illustrated in FIGS. 8, 9 and 10 of the drawings. The apparatus and method illustrated in FIGS. 8-10 is very similar to the apparatus and method 30; therefore, such apparatus and method will be designated by the reference numeral 30A and representative parts of such apparatus and method which are similar to corresponding parts of the apparatus 30 will be designated in the drawings by the same reference numeral as in the apparatus 30 (whether or not such representative parts are mentioned in the specification) following by an associated letter designation A and not described again in detail. Only those component parts of the apparatus 30A which are different from corresponding parts of the apparatus 30 will be designated by a new reference numeral also followed by the letter designation A and described in detail.

The apparatus and method 30A comprises a coating device 31A as illustrated in FIG. 8 and device 31A employs a trough 50A which is also an open top trough. The trough 50A is of generally semicylindical configuration 113A and has roughly semicircular ends 114A. The main difference between the trough 50A and the trough 50 is that instead of discharging liquid foamed plastisol through an orifice or elongate slot at the bottom thereof, trough 50A is in the form of an overflow trough having a lip 115A at one edge and an extension 116A of the lip whereby fluid overflowing the lip 115A flows along the extension 116A to define a curtain of liquid foamed plastisol. A directional flow pan 117A may be suitably disposed in a hinged manner beneath the extension 116A for more precise control of the direction of flow of the curtain of liquid foamed plastisol.

To more precisely direct the overflow of liquid foamed plastisol, the angle of the lip 115A and extension 116A relative to a horizontal plane may be controlled by a pair of handles 120A provided at opposite ends of the trough 50A for tilting of such trough in any desired manner. An angle of tilt indicating pointer 121A is provided and operatively connected to one end 114A of the trough and such pointer operatively associates with a position indicating dial 122A suitably fixed to a pan support structure 51A. The pointer 121A and dial 122A enable a visual determination of the degree of tilt of the trough 50A.

Liquid foamed plastisol is introduced into the open top trough 50A through a flexible conduit 70A such as a flexible filler hose 70A which has a pair of outlet nozzles 123A communicating therewith. The outlet nozzles 123A extend through opposite ends 114A of the trough 50A and such nozzles 123A are connected by a manifold system 124A to hose 70A. The manifold system is defined by a horizontally disposed conduit 125A which is in flow communication with the discharge end of the hose 70A employing a tee connection 126A. Each nozzle 123A is placed in flow communication with an associated end of the conduit 125A by an associated flexible conduit 127A. A flow control valve 130A is provided in each conduit 127A to control the flow therethrough and thereby assure that the flow of liquid foamed plastisol introduced by each nozzle 123A is substantially the same and provides the predetermined level across the full length of the trough 50A assuring precise overflow across such full length and the provision of the curtain of liquid foamed plastisol in the required manner.

Figure 11:
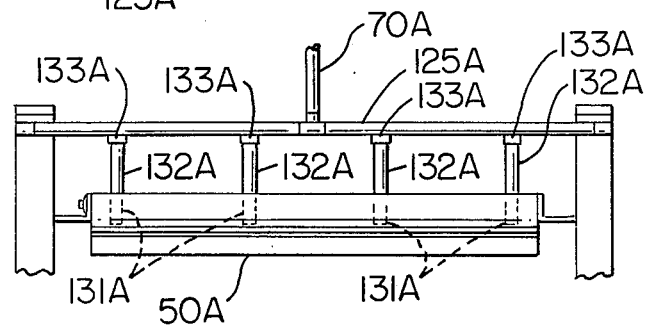
FIG. 11 is a view similar to FIG. 10 illustrating a modified filler apparatus for the trough of FIG. 8.

A modification of the technique of FIGS. 8-10 for providing and maintaining the precisely controlled predetermined level of liquid foamed plastisol in trough 50A is shown in FIG. 11. In this instance flow into the trough 50A is achieved by employing a plurality of more than two nozzles and in this example a plurality of four nozzles each designated by the same reference numeral 131A are provided and placed in flow communication with conduit 125A using connecting conduits 132A. An adjustable flow control valve 133A is provided at the inlet of each conduit 132A to precisely control the amount of liquid foamed plastisol exiting an associated nozzle 131A whereby nozzles 131A with their flow control valves 133A provide a precise predetermined level of liquid foamed plastisol into the trough 50A and again for the purpose of assuring that the curtain of liquid foamed plastisol overflowing the lip 115A and extension 116A thereof is controlled with precision.

As previously indicated, the fibers 25 comprising the fibrous pad 21 may be any suitable fibers known in the art including natural fibers, synthetic fibers, or a mixture or blend of natural and synthetic fibers. In one application of this invention cotton fibers were used and constituted 70% of the fibers with the remaining fibers constituting 30% of the fibers and being synthetic fibers.

Each fibrous pad 21 may also be made of a plurality of layers of garnetted stock which are suitably formed together as a single thickness structure. The number of layers may vary depending upon the thickness and weight per unit volume thereof plus the overall desired compacted thickness of the fibrous pad 21; and the number of layers may range between 2 and 6 layers, and even more. The utilization of a plurality of layers of garnetted stock fibers enables bonding of the fibers in each layer by a suitable resin in an optimum manner and as is known in the art and enables such layers to be needle punched or similarly interconnected as a single mat or pad and then subsequently processed as required to define the preformed or contoured pad against which the foamed plastisol layer is defined in accordance with the teachings of this invention.

The layer 22 is defined by a composition consisting primarily of a plastic resin, plasticizer, filler material, solvent, and a foaming aid. A particular example of the constituents of such a composition is shown in the following Table I.

TABLE I

| ITEM | CONSTITUENT | PARTS BY WEIGHT |
|---|---|---|
| 1. | Resin (polyvinyl chloride) | 100 |
| 2. | Plasticizer-(dialkyl phthalate) | 109 |
| 3. | Filler (558 parts barium sulfate (158 parts calcium carbonate) | 716 |
| 4. | Water Moisture Extractor (calcium oxide) | 3 |
| 5. | Solvent | 38 |
| 6. | Foaming Aid | 14 |

It will be seen from Table I that the filler consists of 558 parts of barium sulfate to 158 parts of calcium carbonate whereby the ratio of barium sulfate to calcium carbonate is roughly 4½ to 1. Similarly, it will be seen that the total filler weight is roughly seven times the weight of the plasticizer and also roughly seven times the weight of the polyvinyl chloride resin.

It will also be appreciated that the weight of filler employed may be varied to keep the overall expense of the panel at a minimum. It has been found that for a given weight of resin the weight of filler may be varied to range between 3 and 9 times the weight of such resin.

A water moisture extractor may be required and if utilized is preferably in the form of calcium oxide. However, it is to be understood that such water moisture extractor is employed only as needed and in some applications may not be required. Similarly, it will be seen that a solvent is listed and any suitable solvent may be used with it being understood that such solvent is only employed for the purpose of controlling the viscosity of the composition.

The foaming aid which is utilized may be any suitable foaming aid employed in the art and one example of a foaming aid which has been used successfully is sold by the Dow Corning Corporation, P. O. Box 1767, Midland, Michigan 48640 and sold under the trade designation DC-1250-Foaming Aid. The foaming aid is provided to assure that the air pockets or spaces 24 in layer 22 are provided as required and without detrimental effect on the structural properties of such layer.

Preferably the amount of air introduced by the foamer 65 is such that the air pockets 24 comprise between 30 and 70% of the total volume of the plastisol layer 22. It will be appreciated that this volume and control of the air pockets is achieved by controls provided on the foamer.

The foamer 65 may be any suitable foaming unit employed in the art and which introduces air into the composition and assures substantially uniform dispersal of such air therethrough. One exemplary embodiment of a foaming unit or a foamer which has been employed is manufactured and sold by the Oakes Machine Company, 26 Cammock Road, Islip, Long Island, New York 11751.

While present exemplary embodiments of this invention, and methods of practicing the same, have been illustrated and described, it will be recognized that this invention may be otherwise variously embodied and practiced within the scope of the following claims.

What is claimed is:

1. In a method of making a sound insulating panel for an automobile and comprising the steps of, forming a contoured fibrous pad, coating said pad with a liquid plastisol layer, and curing said plastisol layer, the improvement wherein said coating step comprises the steps of continuously moving said pad on a conveyor having openings therein, disposing an open top elongate trough vertically above said conveyor and pad, and flowing entirely by gravity a solid curtain of liquid foamed plastisol from said trough against at least one surface of said pad while continuously moving said pad thereunder, said curtain extending across one full dimension of said pad while moving said pad at a constant speed through said curtain, said liquid foamed plastisol upon curing thereof defining a foamed plastisol layer bonded against said pad, said layer having randomly disposed air pockets throughout which serve to reduce the overall weight of said panel while improving the acoustical properties thereof.

2. A method as set forth in claim 1 and comprising the further step of maintaining a predetermined level of liquid foamed plastisol across the entire length of said trough to assure provision of a uniform static pressure head thereacross to thereby define said curtain of liquid foamed plastisol as a controlled curtain.

3. A method as set forth in claim 2 in which said maintaining step comprises introducing liquid foamed plastisol into said trough with a filler hose having an outlet nozzle and reciprocating said nozzle across said trough to maintain said predetermined level.

4. A method as set forth in claim 2 in which said maintaining step comprises introducing liquid foamed plastisol into said trough with a filler hose having a plurality of outlet nozzles communicating therewith and placing said outlet nozzles to provide flow of liquid foamed plastisol at symmetrical locations in said trough to maintain said predetermined level.

5. A method as set forth in claim 4 in which said plurality of nozzles consists of a pair of nozzles and said step of placing said outlet nozzles comprises extending said pair of nozzles through opposite ends of said open top trough into the interior of said trough.

6. A method as set forth in claim 4 in which said plurality of outlet nozzles comprises a plurality of more than two nozzles and said step of placing said nozzles comprises disposing said outlet nozzles so that each discharges liquid foamed plastisol at predetermined locations in said open top trough.

7. A method as set forth in claim 2 in which said open top elongate trough has a single elongate discharge slot at the bottom thereof for discharging said liquid foamed plastisol therethrough to help define said solid curtain of foamed plastisol and comprising the further step of controlling the effective area of said single slot, said area cooperating with said static pressure head to define said controlled curtain.

8. A method as set forth in claim 2 in which said open top elongate trough is of roughly semicylindrical configuration and has an overflow lip along one side thereof which extends across its full length and comprising the further step of tilting said trough to control the angle of discharge of liquid foamed plastisol from said trough and thereby define said controlled curtain of liquid foamed plastisol.

* * * * *